(12) United States Patent
Bates et al.

(10) Patent No.: US 7,146,571 B2
(45) Date of Patent: Dec. 5, 2006

(54) SYSTEM AND METHOD FOR TWO TIER PASTE BUFFER AND DISPLAY

(75) Inventors: Cary L. Bates, Rochester, MN (US); Gilford F. Martino, Endwell, NY (US); John M. Santosuosso, Rochester, MN (US); Vincent T. Timon, III, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/062,128

(22) Filed: Jan. 31, 2002

(65) Prior Publication Data
US 2003/0142134 A1   Jul. 31, 2003

(51) Int. Cl.
G06F 17/21 (2006.01)
G06F 17/24 (2006.01)
G06F 17/27 (2006.01)
G06F 17/26 (2006.01)
G06F 17/28 (2006.01)
G06F 3/01 (2006.01)

(52) U.S. Cl. .................. 715/770; 715/531; 715/512
(58) Field of Classification Search ................ 715/770, 715/900, 539, 531, 512, 739
See application file for complete search history.

(56) References Cited

U.S. PATENT DOCUMENTS

| | | | | |
|---|---|---|---|---|
| 3,810,107 | A | * 5/1974 | Goldman et al. | 715/531 |
| 5,070,478 | A | 12/1991 | Abbott | |
| 5,574,840 | A | * 11/1996 | Kwatinetz et al. | 715/531 |
| 5,801,693 | A | 9/1998 | Bailey | 345/339 |
| 5,890,183 | A | * 3/1999 | Fujimoto | 715/540 |
| 5,926,633 | A | 7/1999 | Takagi et al. | 395/566 |
| 5,964,834 | A | 10/1999 | Crutcher | 709/213 |
| 6,209,021 | B1 | 3/2001 | Ahimovic et al. | 709/204 |

FOREIGN PATENT DOCUMENTS

| | | |
|---|---|---|
| EP | 1093058 A1 | 4/2001 |
| GB | 2326744 A | 12/1998 |
| JP | 2000181912 A | 6/2000 |
| KR | PUPA 10-2001-45591 | 6/2001 |

OTHER PUBLICATIONS

Voss, Bob. "Special Edition Using Windows 98". QUE [Online] Available http://cma.zdnet.com/book/ch12/ch12.htm.*
Apperley, M. et al., "Breaking the copy/paste cycle: the Stretchable Selection Tool", IEEE Xplore, Feb. 3, 2000.*
Miller, RC and BA Myers. "Synchronizing Clipboards of Multiple Computers", Proceedings of the 12th Annual ACM Symposium on User Interface Software and Technology, pp. 65-66, New York, 1999 [Inspec AN 6708648, ABN c2000 -10-6155-007].

(Continued)

*Primary Examiner*—Raymond J. Bayerl
*Assistant Examiner*—Namitha Pillai
(74) *Attorney, Agent, or Firm*—Shelley M Beckstrand

(57) ABSTRACT

A system and method is provided for inserting into a display material copied to a clipboard. A user selects material to be copied the clipboard. The system selects and copies to the clipboard additional material. The user selects an insertion point for the user selected material, and the system displays to the user the user selected material and selective additional material. The system selected material is, in accordance with a more specific embodiment, that material which is needed to render the user selected material syntactically correct in the context of the insertion point.

34 Claims, 5 Drawing Sheets

OTHER PUBLICATIONS

Rogers, J. "Copying Files From the Clipboard to a Command Prompt", C/C++ Users Journal, vol. 18, No. 7, pp. 28, 30-32, Jul. 2000 [Inspec AN 6639304, ABN C2000-08-6150E-006].

Apperley, M, D. Fletcher and B. Rogers. "Breaking the Copy/Paste Cycle: the Stretchable Selection Tool", Proceedings First Australasian User Interface Conference, Los Alamitos, CA, 1999 [Inspec AN 6483771, ABN C2000-03-6180G-003].

Oshiyama, T. "Intuitive and Simple Clipboard", IBM Technical Disclosure Bulletin, v. 40, n. 9, Sep. 1997, p. 111-112.

Erickson, C.R. And R. Huang. "OS/2 Presentation Manager Clipboard Support for a Windowed 5250 Emulator", IBM Technical Disclosure Bulletin, n.2, Jul. 1992, p. 323-332.

Ishmael, N. Jr., et al. "Paste as New". Research Disclosure No. 431, Mar. 2000, Article 130, p. 545.

Patent Application RO999-060, Bates, et al., "Copy/paste Mechanism and Paste Buffer that Includes Source Information for Copied Data", U.S. Appl. No. 09/456,157, filed Dec. 7, 1999.

Katrina E. Kerry, "STEVE: A Syntax Directed Editor for VHDL", Department of Computer Science, University of Adelaide, Nov. 1996.

Katrina E. Kerry, "STEVE: A Syntax Directed Editor for VHDL", Department of Computer Science University of Adelaide, Nov. 1996.

* cited by examiner

SYSTEM AND METHOD FOR TWO TIER PASTE BUFFER AND DISPLAY

BACKGROUND OF THE INVENTION

1. Technical Field of the Invention

This invention pertains to front-of-screen processing. More particularly, it relates to copying and pasting of numerics, text or code using a two tier clipboard or buffer.

2. Background Art

It is known in the art to provide a clipboard or buffer into which material such as display data selected by a user is copied for subsequent pasting into another area of the display. Referring to FIG. 1, step 10, this selection is typically done by blocking (highlighting) the material or portion to be deleted or copied. In step 12, the material (numeric, text, code, etc.) moved to the clipboard may be removed from its original location (a delete operation) or left (a copy operation). In step 14, the user selects an insertion point, typically by positioning a cursor, and in step 16 pastes the clipboard content at the insertion point.

It happens that the user will sometimes block less display data than is desired or syntactically correct. For example, a user may block only a portion of a telephone number, missing one or more digits in the process. Similarly, a programmer may block, or highlight, a section of source code to paste into another section of the code and in so doing miss a portion of the code structure required for correct syntax.

It is an object of the invention to provide an improved system and method for copying material from one display location to a second location.

It is a further object of the invention to provide a system and method for assuring that partially blocked data is copied in its entirety.

It is a further object of the invention to provide a system and method for assuring that syntactically complete data is copied for a partially selected section of data.

SUMMARY OF THE INVENTION

A system and method is provided for inserting into a display material copied to a clipboard. A user selects material to be copied into the clipboard. The system selects and copies to the clipboard additional material. The user selects an insertion point for the user selected material, and the system displays to the user the user selected material and selective additional material. The system selected material is, in accordance with a more specific embodiment, that material which is needed to render the user selected material syntactically correct in the context of the insertion point.

In accordance with an aspect of the invention, there is provided a computer program product configured to be operable to display user selected and additional system selected material at an insertion point in a computer display monitor.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
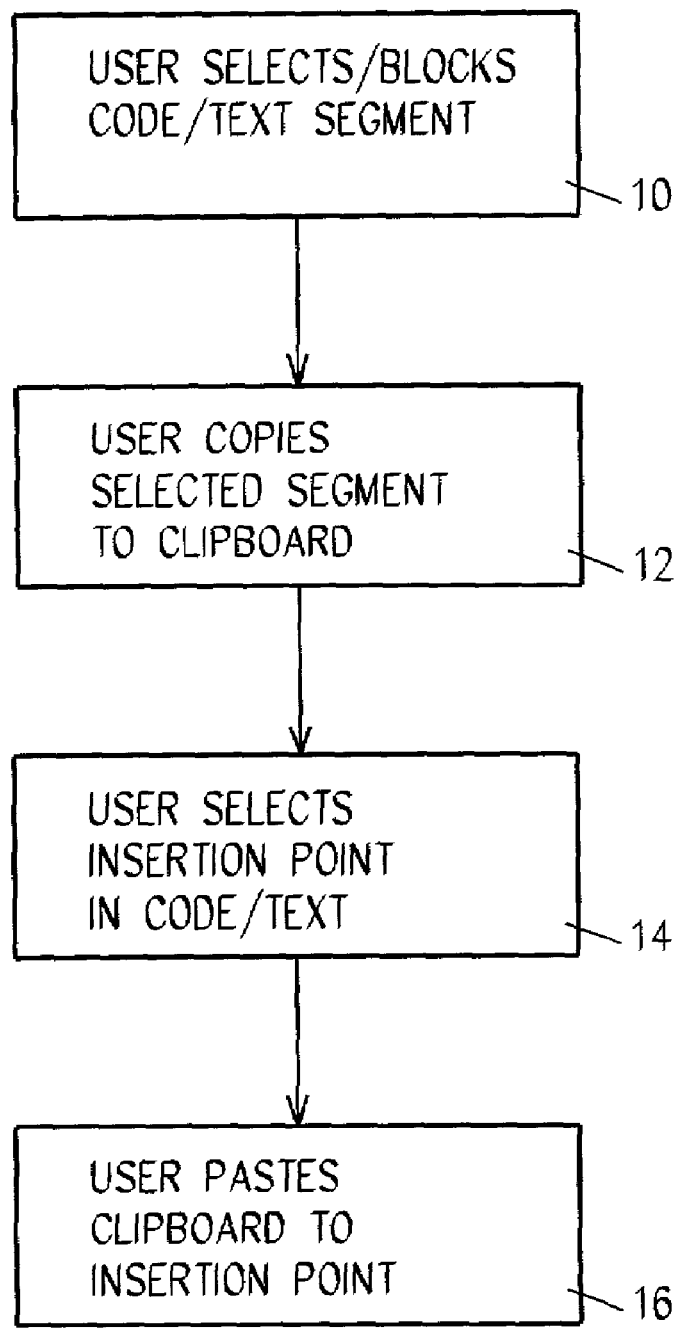
FIG. 1 is a flow chart representation of a prior art cut/copy and paste operation.
Figure 2:
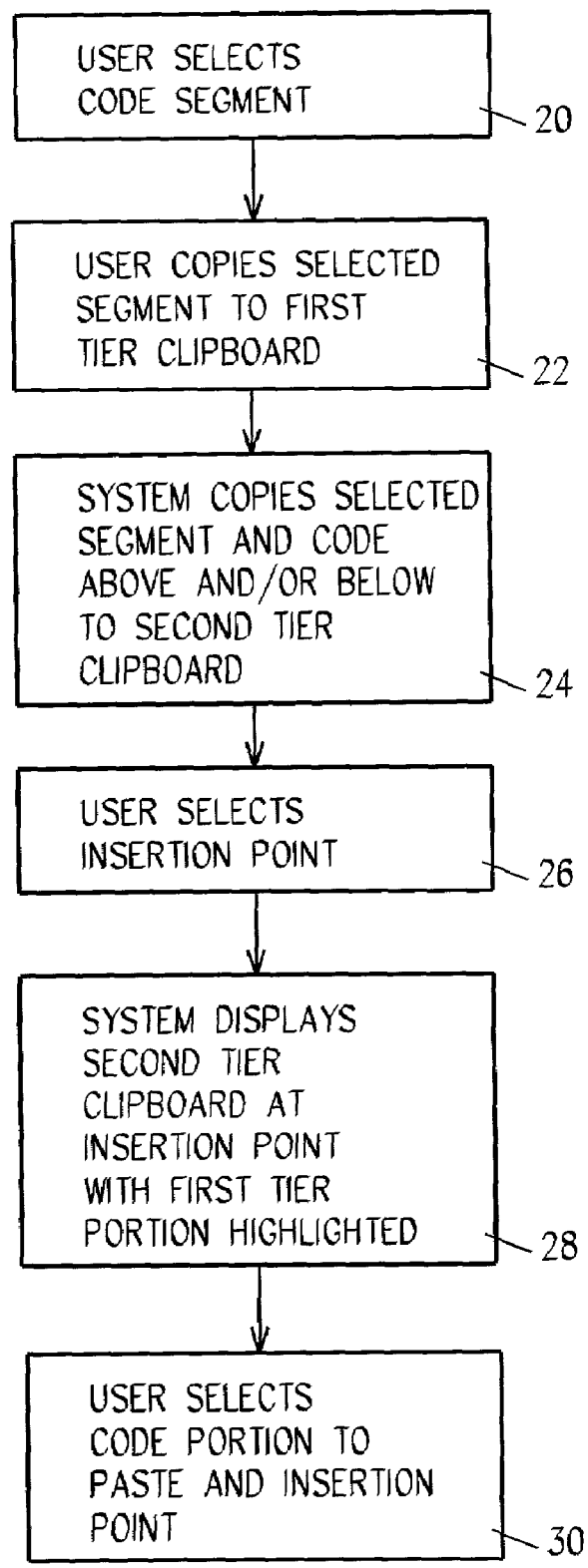
FIG. 2 is a flow chart representation of the two-tier cut/copy and paste operation of a preferred embodiment of the invention.

Referring to FIG. 2, the method of a preferred embodiment of the invention for performing a copy/cut and paste operation is set forth. In step 20, a user selects material for copying. In FIG. 2, the operation is described with respect to programming code, but material to be copied and pasted may be any material, such as text, numeric, code, tabular, or graphic data or combinations thereof. In step 22, the user copies the selected material to a first tier clipboard, and in step 24 the system selects and adds additional material, typically surrounding material, to a second tier clipboard. These first and second tier clipboards may be implemented as separate locations in storage, or as a single location with appropriate pointers, for example. In step 26, the user selects the insertion point and executes the paste command. In step 28, the system responds by inserting second tier material with the first tier material highlighted (in a first manner, such as by a first color or bold type) and selectively additional material also highlighted (but in a second manner, such as by a second color or italics type). In step 30, the user selects the portion of inserted code to be retained at the insertion point.

A purpose of the highlighting is not only to show the user that material in addition to that which has been selected has been pasted, but also to allow the user to accept or remove the additional material. This may be done with respect to text, for example, by the user positioning the curser at the highlighted text and click on it. At this point, the highlighting disappears and the text becomes permanent at the insertion point. To remove the text, for example, the user may actuate a delete key, or move the cursor elsewhere and continue editing. Also, the additional material may be retained if the user starts editing it.

A phone number provides another example. That is, suppose a phone number is displayed as 555-1212, and in step 20 the user blocks or selects just the portion 555-121 for copying. When in step 22 the user copies this into an input field that is formatted for phone numbers, the application that controls that input field will typically execute code for validating the syntax and determine that the blocked portion is invalid. In this case, that application may access the second tier of the clipboard to obtain the text which completes the number and in step 28 displays 555-1212 to the user (with the additional material, the second "2", highlighted), who may then in step 30 click on the highlighted portion to accept the complete number.

Various alternative approaches may be implemented for selecting material to add to or remove from the second tier of a clipboard. For example, code material including one or more coding brackets above and below the material selected for pasting may be selected for inclusion in the second tier. Alternatively, only those brackets required for a selected code snippet to compile is included, which means an equal number of opening and closing brackets. Or, second tier material required to complete a function, ie. a complete while loop, or an if/then/else statement, is included in the second tier. Or, an arbitrary number of lines above and/or below the blocked material may be copied to the second tier. These techniques are merely illustrative of many which may be envisioned for selecting material for the second tier.

Figure 3:
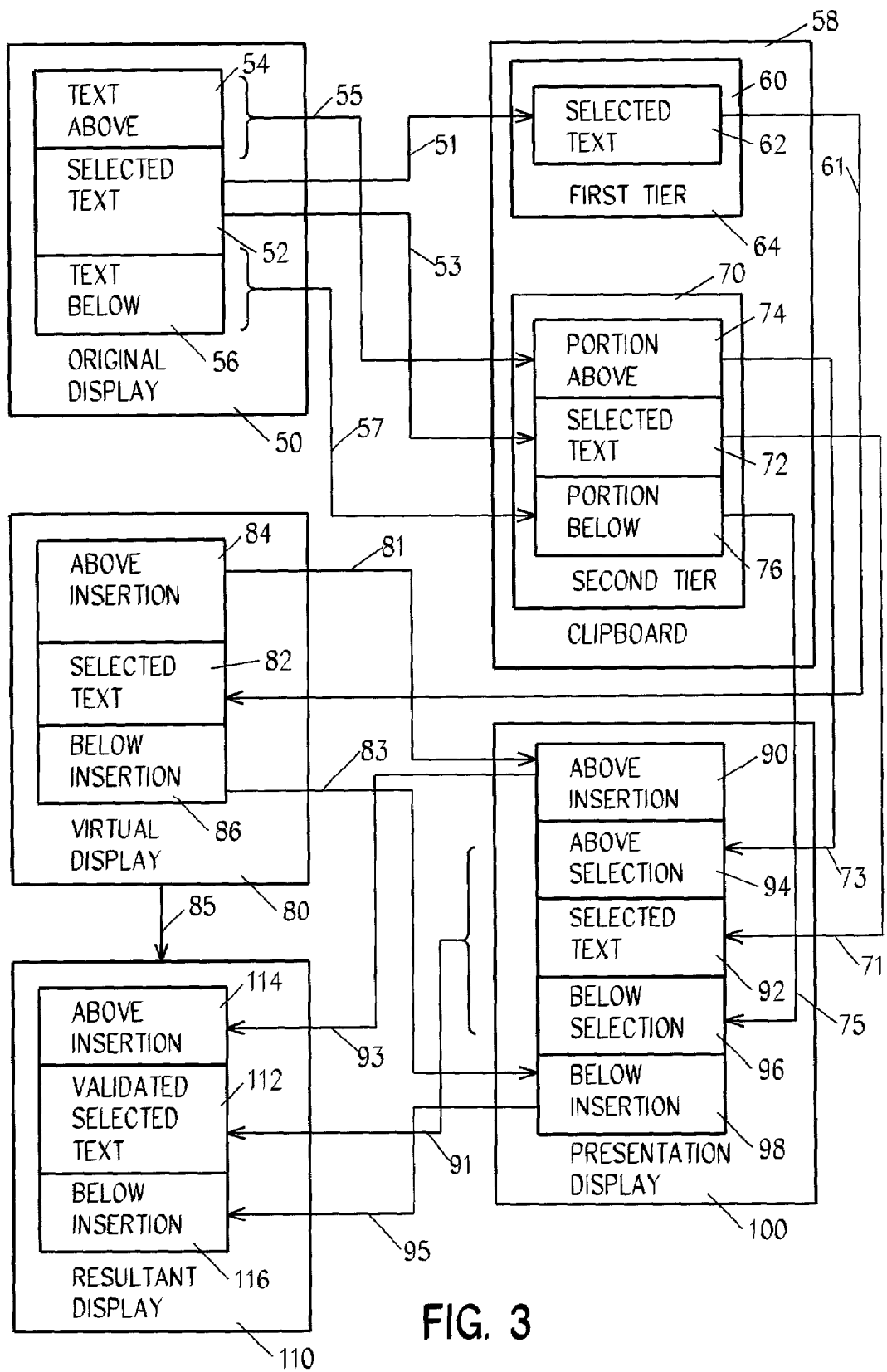
FIG. 3 is a schematic representation of data structures for implementing a two-tier clipboard in accordance with a preferred embodiment of the invention.

Referring to FIG. 3, a schematic of data structures accessed or used by a controller for implementing a preferred embodiment of the invention is shown. Original display 50 presents to the user several lines, for example, of material—herein, text or code text. The user may block or otherwise select a portion 52 of the text presented in display 50, at which point text 54 above and text 56 below that selected is determined.

Clipboard 58 includes a first tier portion 64 into which selected text 52 is loaded as selected text 62, as is represented by line 51, and a second tier portion 70 into which selected text 52 is loaded as selected text 72, as is represented by line 53. Some portions of text above 54 and of text below 56 are copied to second tier 70 as portion above 74 and portion below 76, as is represented by lines 55 and 57, respectively.

Virtual display 80 receives selected text 62 from first tier 64 and places it as selected text 82 at an insertion point between material above insertion 84 and below insertion 86, as is represented by line 61. In accordance with an alternative embodiment of the invention, as is represented by line 85, in the event that selected text 82 is determined to be syntactically correct, resultant display 110 may be generated directly without presenting to the user presentation display 100. In this manner, the user may be presented with a resultant display 110 without the necessity of verifying his selection of selected text 92 or discarding text from selected text 92, and/or above selection 94 and/or below selection 96.

However, if selected text 82 is determined to be syntactically or otherwise incorrect, it is highlighted (first highlighting, such as bold) and displayed as selected text 92 in presentation display 100 between material selected from second tier 70 including some portion 94 above and/or some portion 96 below selected text (with second highlighting, such as italics) at an insertion point between above insertion portion 90 and below insertion portion 98. Resultant display 116 includes, sandwiched between material 114 above insertion point on line 93 and material below insertion 116 on line 95, validated selected text 112 including, as is represented by line 91, the presentation display copy 92 of original, blocked or selected text 52, and the user selected portions, if any, of material 94, 96.

Figure 4A:
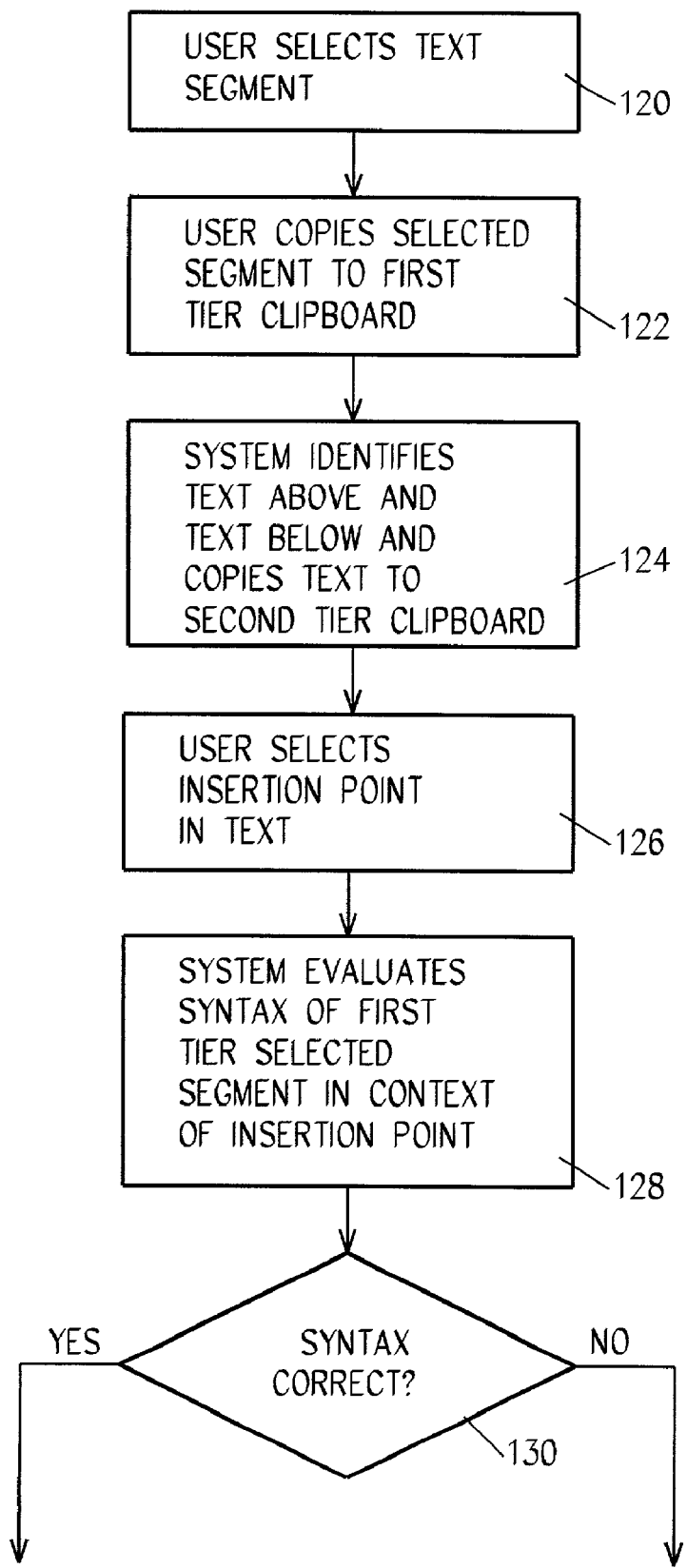
FIG. 4 is a flow chart representation of a further embodiment of a two-tier clipboard operation of the invention.
Figure 4B:
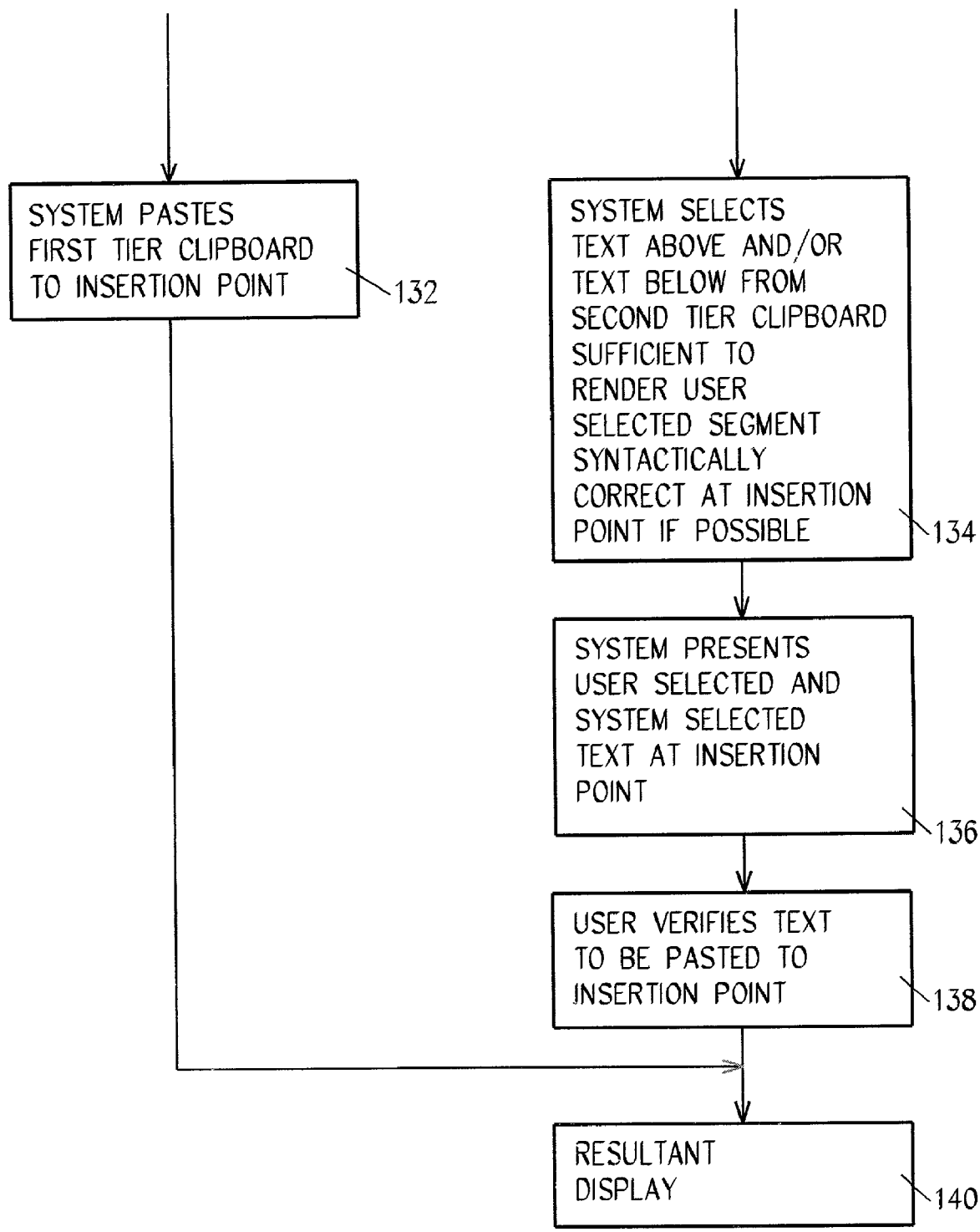

In operation, referring to FIG. 4 in connection with FIG. 3, in step 120 the user selects text segment 52 which, in step 122, he copies to clipboard 58 first tier 64. The system selects text above 54 and text below 56 which it also copies to the clipboard 58 second tier 70. In steps 126, the user selects the insertion point, and in steps 128, 130 the system evaluates (as is represented by virtual display 80) whether the selected text 82 is syntactically or otherwise correct in the context of material above insertion 84 and material below insertion 86. If the syntax is correct, as is represented by line 85 and step 132, the system pastes the first tier clipboard material to resultant display 110, 140 as validated selected text 112. If the syntax is not correct, in step 134 the system selects text above 74 and/or text below 76 from second tier 70 to render the user selected segment 92 syntactically correct at the insertion point, if possible, and in step 136 presents user selected text 92 and system selected text 94, 96 to the user at the insertion point between above insertion 90 and below insertion 98—with material 92 and 94, 96 appropriately highlighted. In step 138 the user verifies, validates, selects or discards as desired the material 92, 94, 96 presented in display 100. In step 140, the validated selected text, including any selected by the user from above selection material 94 and below selection material 96 is displayed at the insertion point between above insertion material 114 and below insertion material 116.

In accordance with a further embodiment of the invention, a user selects a portion of material from a display for copying to a clipboard or buffer, and the system copies additional material from the display to the clipboard. The amount of additional material or content is dependent on the application doing the copy, however, there is a determination made by the application doing the copy with respect to how much additional content to include. When the user attempts to paste the clipboard content into a location determined by an insertion point, the application receiving the content or material examines the clip board to determine if the content is well formed for the location to which it is being pasted. If it is not well formed, the additional content included in the clipboard is examined and alternate starting and stopping positions of the selection tested to determine if well formed content can be constructed using this additional content. If so, this well formed material is pasted into place with the additional content highlighted. Options may be provided so the user can over-ride this additional material, or select some or all of it.

Tables 1, 2 and 3 illustrate various examples of the generation of presentation display 100 for code material in which selected material is syntactically incorrect for failure to include subsequent lines, preceding lines, and both subsequent and preceding lines, respectively.

TABLE 1

Second Tier Including Subsequent Lines

```
       Start with routineA, as follows:
202    routineA( rec *list , char key)
203    {
204        rec *obj;
205        obj = list;
206        while( obj != NULL )
207        {
208            if ( strcmp( obj->key, key )
209            {
210                register(FOUND,obj);
211                break;
212            }
213            obj = obj->next;
214        }
215        return;
216    }
```
The user selects first tier code from routineA segment A comprising lines 206–212, which inadvertently, or by 'mistake', does not include the complete while loop of lines 206–214:
```
206        while( obj != NULL )
207        {
208            if ( strcmp( obj->key, key )
209            {
210                register(FOUND,obj);
211                break;
212        }
```
When the text (code segment A, lines 206–212 shown in bold) is pasted into the following routine(routineB, lines 217–220) at the point (line 219) indicated by the --> . . .
```
217    void routineB( rec obj )
218    {
219        -->
220    }
```
. . . the resulting code portion C is augmented by lines 213 and 214 shown below in italics from the second tier to complete the while loop, as follows:
```
217    void routineB( rec obj )
218    {
206        while( obj != NULL )
```

TABLE 1-continued

Second Tier Including Subsequent Lines

```
207       {
208           if ( strcmp( obj->key, key )
209           {
210               register(FOUND,obj);
211               break;
212           }
213           obj = obj->next;
214       }
220   }
```

TABLE 2

Second tier Including Previous Lines

An example of the second tier having lines above included.
We start with routineA:
```
231   routine1A( rec *list , char key)
232   {
233       rec *obj;
234       obj = list;
235       while( obj != NULL )
236       {
237           if ( strcmp( obj->key, key )
238           {
239               register(FOUND,obj);
240               break;
241           }
242           obj = obj->next;
243       }
244       return;
245   }
```
We select in first tier code segment 1A as follows, which by
'mistake' does not include the complete while loop:
```
237           if ( strcmp( obj->key, key )
238           {
239               register(FOUND,obj);
240               break;
241           }
242           obj = obj->next;
243       }
```
When the text (code segment 1A) is pasted into the following
routine (routine1B) at line 248 indicated by the --> . . .
```
246   void routine1B( rec obj )
247   {
248   -->
249   }
```
. . . the resulting code portion 1C includes lines 235–236
shown in italics from the second tier:
```
246   void routine1B( rec obj )
247   {
235       while( obj != NULL )
236       {
237           if ( strcmp( obj->key, key )
238           {
239               register(FOUND,obj);
240               break;
241           }
242           obj = obj->next;
243       }
249   }
```

TABLE 3

Second Tier Including Subsequent and Previous Lines

An example of the second tier having lines above and below
included.
We start with routine2A:
```
260   routine2A( rec *list , char key)
261   {
262       rec *obj;
263       obj = list;
```

TABLE 3-continued

Second Tier Including Subsequent and Previous Lines

```
264       if (obj.name == 'NONE')
265       {
266           while( obj != NULL )
267           {
268               if ( strcmp( obj->key, key )
269               {
270                   register(FOUND,obj);
271                   break;
272               }
273               obj = obj->next;
274           }
275           return;
276       }
277       else
278       {
279           register(FOUND,obj);
280           obj = obj->next;
281       }
282   }
```
The user selects first tier code segment 2A as follows,
which by 'mistake' (inadvertently) does not include the
if/else statements of lines 264 and 277 just outside the
while loop:
```
266           while( obj != NULL )
267           {
268               if ( strcmp( obj->key, key )
269               {
270                   register(FOUND,obj);
271                   break;
272               }
273               obj = obj->next;
274           }
275           return;
```
When the text(code segment 2A, lines 266–275) is pasted into
the following routine (routine 2B, lines 283–286) at the
point indicated by the --> at line 285 . . .
```
283   void routine2B( rec obj )
284   {
285   -->
286   }
```
. . . the resulting code portion 2C will be augmented by second
tier lines 264–265 and 276–281 in italics:
```
283   void routine2B( rec obj )
284   {
264       if (obj.name == 'NONE')
265       {
266           while( obj != NULL )
267           {
268               if ( strcmp( obj->key, key )
269               {
270                   register(FOUND,obj);
271                   break;
272               }
273               obj = obj->next;
274           }
275           return;
276       }
277       else
278       {
279           register(FOUND,obj);
280           obj = obj->next;
281       }
286   }
```

Advantages over the Prior Art

It is an advantage of the invention that there is provided an improved system and method for copying material from one display location to a second location.

It is an advantage of the invention that there is provided a system and method for assuring that partially blocked data is copied in its entirety.

It is an advantage of the invention that there is provided a system and method for assuring that syntactically complete data is copied for a partially selected section of data.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for copying display material, comprising the steps of:
   displaying to a user first display material;
   accepting from said user a first portion of said first display material;
   storing said first portion to a clipboard;
   identifying and storing to said clipboard a second portion of said first display material;
   accepting from said user an insertion point in second display material;
   examining said first portion with respect to material at said insertion point to determine if said first portion is correct with respect to said insertion point, and if so, pasting said first portion without adjustment to said insertion point;
   if said first portion is not correct with respect to said insertion point, selecting from said second portion, responsive to material at said insertion point, additional material required to render said first portion in combination with said additional material correct at said insertion point; and
   displaying to said user said first portion and said additional material at said insertion point with said first portion highlighted in a first manner and said second portion highlighted in a second manner.

2. The method of claim 1, further comprising the step of:
   selecting as said second portion material from said first display material sufficient to render said second portion well formed at said insertion point.

3. The method of claim 2, further comprising the step of characterizing as well formed first display material which is syntactically correct at said insertion point.

4. The method of claim 2, further comprising the step of selecting for said second portion material in said first display material including within predetermined coding brackets selectively above and selectively beneath said first portion material.

5. The method of claim 2, further comprising the step of selecting for said second portion material in said first display sufficient for said first portion material to compile.

6. The method of claim 2, further comprising the step of selecting for said second portion additional material required to complete a function only partially complete in said first portion.

7. The method of claim 1, further comprising the steps of storing said first portion to a first tier of a clipboard and said second portion to a second tier of said clipboard.

8. The method of claim 1, further comprising the step of accepting from said user action selectively designating second portion material for accepting insertion to or canceling insertion from said insertion point.

9. The method of claim 8, said user action comprising the step of clicking in said second portion.

10. The method of claim 8, said user action comprising the step of editing said second portion.

11. The method of claim 8, said user action comprising the step of activating a delete key.

12. The method of claim 8, farther comprising the step responsive to user acceptance of said second portion of removing highlighting from said first and second portions.

13. The method of claim 1, further comprising the step responsive to determining that said first portion material is well formed at said insertion point of pasting only said first portion material at said insertion point.

14. The method of claim 13, further comprising the step of determining that said first portion material is syntactically correct.

15. A system for displaying material copied to a clipboard, comprising:
   a display for displaying said material;
   a selector operable by a user for designating a first portion of said material for copying and pasting to an insertion point;
   a clipboard for temporarily storing material to be pasted to said insertion point; and
   a controller for displaying to a user first display material; accepting from said user a first portion of said first display material; storing said first portion to said clipboard; identifying and storing to said clipboard a second portion of said first display material; accepting from said user an insertion point in second display material; examining said first portion with respect to material at said insertion point to determine if said first portion is correct with respect to said insertion point, and if so, pasting said first portion without adjustment to said insertion point; if said first portion is not correct with respect to said insertion point, selecting from said second portion, responsive to material at said insertion point, additional material required to render said first portion correct at said insertion point; and
   displaying to said user said first portion and said additional material from said second portion at said insertion point with said first portion highlighted in a first manner and said second portion highlighted in a second manner.

16. The system of claim 15, said clipboard comprising a first tier and a second tier, said first tier for storing said first portion and said second tier for storing second portion.

17. The system of claim 16, said second portion comprising additional material selected from said first display material sufficient to render said first portion properly formed at said insertion point.

18. The system of claim 17, said additional material being that material which renders said first portion syntactically correct.

19. The system of claim 15, said controller further for accepting from said user action selectively designating second portion material for accepting insertion to or canceling insertion from said insertion point.

20. A program storage device readable by a machine, tangibly embodying a program of instructions executable by a machine to perform method steps for copying display material, said method steps comprising:

displaying to a user first display material;

accepting from said user a first portion of said first display material;

storing said first portion to a clipboard;

identifying and storing to said clipboard a second portion of said first display material;

accepting from said user an insertion point in second display material;

examining said first portion with respect to material at said insertion point to determine if said first portion is correct with respect to said insertion point, and if so, pasting said first portion without adjustment to said insertion point;

if said first portion is not correct with respect to said insertion point, adjusting said second portion as required, responsive to material at said insertion point, to render said first portion correct at said insertion point; and displaying to said user said first portion and said second portion at said insertion point with said first portion highlighted in a first manner and said second portion highlighted in a second manner.

21. The program storage device of claim 20, said method steps further comprising:

selecting as said second portion material from said first display material sufficient to render said second portion well formed at said insertion point.

22. The program storage device of claim 21, said method steps further comprising characterizing as well formed first display material which is syntactically correct at said insertion point.

23. The program storage device of claim 21, said method steps further comprising selecting for said second portion material in said first display material including within predetermined coding brackets selectively above and selectively beneath said first portion material.

24. The program storage device of claim 21, said method steps further comprising selecting for said second portion material in said first display sufficient for said first portion material to compile.

25. The program storage device of claim 21, said method steps further comprising selecting for said second portion additional material required to complete a function only partially complete in said first portion.

26. The program storage device of claim 20, said method steps further comprising storing said first portion to a first tier of a clipboard and said second portion to a second tier of said clipboard.

27. The program storage device of claim 20, said method steps further comprising accepting from said user action selectively designating second portion material for accepting insertion to or canceling insertion from said insertion point.

28. The program storage device of claim 27, said user action comprising the step of clicking in said second portion.

29. The program storage device of claim 27, said user action comprising the step of editing said second portion.

30. The program storage device of claim 27, said user action comprising the step of activating a delete key.

31. The program storage device of claim 27, said method steps further comprising the step responsive to user acceptance of said second portion of removing highlighting from said first and second portions.

32. The program storage device of claim 20, said method steps further comprising the step responsive to determining that said first portion material is well formed at said insertion point of pasting only said first portion material at said insertion point.

33. The program storage device of claim 32, said method steps further comprising determining that said first portion material is syntactically correct.

34. A computer program product for copying display material:

a machine readable medium;

first program instructions for displaying to a user first display material;

second program instructions for accepting from said user a first portion of said first display material;

third program instructions for storing said first portion to a clipboard;

fourth program instructions for identifying and storing to said clipboard a second portion of said first display material;

fifth program instructions for accepting from said user an insertion point in second display material;

sixth program instructions for examining said first portion with respect to material at said insertion point to determine if said first portion is correct with respect to said insertion point, and if so, pasting said first portion without adjustment to said insertion point;

seventh program instructions responsive to said first portion not being correct with respect to said insertion point for adjusting said second portion as required, responsive to material at said insertion point, to render said first portion correct at said insertion point;

eighth program instructions for displaying to said user said first portion and said second portion at said insertion point with said first portion highlighted in a first manner and said second portion highlighted in a second manner; and wherein said first, second, third, fourth, fifth, sixth, seventh, and eighth program instructions are recorded on said machine readable medium.

* * * * *